Patented Feb. 7, 1933

1,896,088

UNITED STATES PATENT OFFICE

FREDERICK E. KERN, OF ST. LOUIS, MISSOURI

PROCESS OF REDUCING ORES

No Drawing.     Application filed June 18, 1930. Serial No. 462,133.

This invention relates to a process for reducing ores, and with regard to certain more specific features, to a process for reducing oxide ores of iron.

Among the several objects of the invention may be noted the provision of a process of the class described which employs, as a single homogeneous charge, a mixture of ore, reducing material, and flux; a process which is especially adaptable to low-grade ores and/or low-grade reduction materials; a process wherein the mixture for reduction is prepared separately from the reduction process, and is capable of indefinite storage; and a process of the class described which is easily and economically carried through with a minimum of expensive treating materials. Other objects will be in part obvious and in part pointed out hereinafter.

The invention accordingly comprises the elements and combinations of elements, steps and sequence of steps and features of synthesis which will be exemplified in the description hereinafter and the scope of the application of which will be indicated in the following claims.

Low-grade ores of iron, such as the soft red hematite ore, containing up to 17 per cent. of silica, have heretofore been considered impractical to reduce, because of the large quantities of fluxing materials, such as lime or dolomite, required.

It has further been found impracticable to utilize, as by coking, certain coals containing high percentages of alumina, which are ordinarily known as "bone coals".

I have found that, in suitable proportions, this low-grade ore and this bone coal can be mixed to form effective reduction mixtures. The carbonaceous constituents of the coal serve as a reduction agent for the iron oxide in the ores, while the silica of the ores and the alumina of the coal form an effective "slag". Thus, no additional reducing or slagging material is necessary to effect complete reduction.

In carrying out my invention, I first preferably comminute, separately, the ore and the coal, then mix the two and plasticize the mixture. The plasticizing is preferably accomplished by the addition of water, which combines with the alumina detached from the coal by the grinding, and forms a binder for the mixture. Other plasticizing agents, such as acids, chlorides, and alkalies, can be used with beneficial results. The plastic mass, thoroughly homogenized, is then molded into shapes or briquettes. The briquettes are dried, and the dried briquettes form the charging stock for the reduction.

The first stage of the reduction comprises slowly bringing the briquettes to a temperature of the order of 600° C. This first stage effects a destructive distillation or carbonization of the carbonaceous material in the briquettes, with an attendant evolution of vapors of hydrocarbons, tars, tar acids, phenols, and other similar constituents. These vapors in part serve to reduce the oxide ores present. The vapors are preferably collected and condensed in a manner customary in the art.

At the conclusion of the distillation, when substantially no more vapors are being evolved, the briquette comprises partially reduced oxide ores, coke particles, and aluminum silicate, all thoroughly intermixed. A reduction atmosphere is now maintained about the briquette, either by admitting a limited supply of air to the distillation retort, or by placing the distilled briquette in a separate reduction furnace. Heating is continued, and the temperature preferably rises above 700° C. The limited amount of air causes the burning of the coke in the briquettes to carbon monoxide, which, being formed in contact with the particles of oxide ore, exerts a particularly effective reduction action on these oxides. At the same time, the alumina and silica are combining to form a more or less vitrified slag of aluminum silicate. The heating is continued until reduction is complete. Further heating, as in a blast furnace, to melt the metal and/or completely melt or vitrify the slag, may be utilized if desired.

When the reduction is stopped before the melting of the metal and/or slag, the briquette is removed from the reduction zone and allowed to cool. The cooled briquette comprises, primarily, finely dispersed metal, usually in a porous condition, and aluminum silicate. The briquette is crushed, and the metal removed from the slag by methods such as magnetic separation or air or liquid flotation. The metal so obtained may be separately melted for casting, alloying or the like.

An advantage of briquetting is that the charge may be placed in the distillation zone or reduction zone in such a manner that the passage of heating gases, reduction gases and the like is facilitated. A further advantage is that the ore and the reduction material are present in each briquette in the proper predetermined amount for optimum reduction, thereby avoiding the difficulties attendant upon concentration of reduction material in one place, and a concentration of ore in another place, as is the case with loose charges.

The following is one specific example of the process:

Low-grade hematite ore is ground to a fineness sufficient to pass through a 100 mesh screen. "Bone" coal, containing approximately 70% carbonaceous constituents and 30% clay-like matter, primarily alumina, is similarly ground. The dry ground ore and coal are then thoroughly mixed in the proportion of 40% ore to 60% coal. The dry mixture is then plasticized with sufficient water in a pug mill or the like, and then formed into shapes or briquettes in a ceramic extrusion press or the like. The shapes or briquettes are then dried, as by passing through a drying oven on a conveyor belt. The dried briquettes may be stored indefinitely, or may be utilized at once in the reduction process. For reduction, the briquettes are charged into a carbonizing retort, and the temperature gradually brought to the order of 700° C. The volatile constituents which come off are preferably collected and condensed. When volatile materials substantially cease to come off, while heating is continued, air is admitted to the retort in limited quantities, so as to cause the consumption of some of the coke. Heating is now carried above 700° C. until aluminum silicate is formed within the briquettes. The time at which aluminum silicate is formed is usually established by separate experiments for various starting materials. The formation of aluminum silicate in any case is indicated by the greatly increased hardness of the briquette. The briquettes are then allowed to cool, are crushed, and the metallic iron removed in a magnetic separator from the remainder of the mass.

It is to be understood that other oxide ores than those of iron can be reduced by the process herein disclosed. Such other oxides include those of copper, lead, zinc, nickel, cobalt, and the like.

In view of the foregoing, it will be seen that the several objects of the invention are achieved and other advantageous results attained.

As many changes could be made in carrying out the above objects without departing from the scope of the invention, it is intended that all matter contained in the above description shall be interpreted as illustrative and not in a limiting sense.

I claim:

1. The process of reducing low-grade oxide ores having a silica content which comprises pulverizing said ores, mixing said pulverized ores with a pulverized carbonaceous reducing material having an alumina content, in such proportions that the alumina is sufficient, without the addition of extraneous material, to flux the silica present, plasticizing the mixture, forming the plastic mixture into briquettes, and heating said briquettes to destructively distill said carbonaceous material whereby it is formed into volatiles and coke, and further heating said briquettes whereby said oxide ores are reduced and said alumina and said silica constituents combine to form a slag.

2. The process of reducing ores which comprises mixing pulverized ores with pulverized distillable carbonaceous reducing material, said reducing material having therein fluxing constituents adapted to form a slag with the impurities present in said ores, the mixture being made in such proportion that the impurities in the ores and fluxing constituents of the reducing materials are present in amounts sufficient, without extraneous additions, to react with each other to remove substantially all of said impurities in the form of a slag, subjecting said mixture first to a destructive distillation and then to a reduction temperature whereby said reducing material reacts to reduce said ores and said slag is formed from the impurities of said ore, and separating said reduced ores from said slag.

3. The process of reducing low-grade oxide ores having a silica content of the order of 17 per cent. which comprises pulverizing said ores, mixing said pulverized ores with a pulverized carbonaceous reducing material having an alumina content of the order of 30 per cent., the mixture being made in such proportion that the silica and alumina are present in amounts sufficient, without extraneous additions, to react with each other substantially completely to use up both, and subjecting said mixture to heat treatment, whereby said carbonaceous material reduces said ore and said silica and said alumina substantially completely interreact to form a slag.

4. The process of reducing iron ores having a high silica content which comprises comminuting said ores to a fineness of the order of 100 mesh, mixing therewith comminuted bone coal having a high alumina content in the approximate proportion of 40% ore and 60% coal, plasticizing said comminuted mixture with water, forming said plastic mixture into briquettes, and drying said briquettes; subsequently subjecting said dried briquettes to a destructive distillation at temperatures up to about 700° C. whereby volatiles are evolved which reduce said ore in part, heating said distilled briquettes in a limited stream of air at temperatures above the order of 700° C. whereby said ore is entirely reduced to metal and said silica combines with said alumina to form a slag, cooling said briquettes, crushing the cooled briquettes, and removing the metal from the slag.

In testimony whereof, I have signed my name to this specification this 13th day of June, 1930.

FREDERICK E. KERN.